(12) United States Patent
Sierra et al.

(10) Patent No.: US 11,953,096 B2
(45) Date of Patent: Apr. 9, 2024

(54) STRUT BEARING ASSEMBLY WITH METAL GUIDE RING AND SPRING SEAT

(71) Applicant: Schaeffler Technologies AG & Co. KG, Herzogenaurach (DE)

(72) Inventors: Kleberson Sierra, Sorocaba (BR); Elias Ferreira Machado, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 171 days.

(21) Appl. No.: 17/722,549

(22) Filed: Apr. 18, 2022

(65) Prior Publication Data

US 2023/0332689 A1    Oct. 19, 2023

(51) Int. Cl.

| | |
|---|---|
| *B60G 15/06* | (2006.01) |
| *F16C 19/10* | (2006.01) |
| *F16C 33/76* | (2006.01) |
| *F16C 33/78* | (2006.01) |
| *F16C 33/80* | (2006.01) |
| *F16J 15/3272* | (2016.01) |
| *F16J 15/447* | (2006.01) |

(Continued)

(52) U.S. Cl.
CPC .......... *F16J 15/54* (2013.01); *B60G 15/068* (2013.01); *F16C 19/10* (2013.01); *F16C 33/761* (2013.01); *F16C 33/782* (2013.01); *F16C 33/80* (2013.01); *F16J 15/3272* (2013.01); *F16J 15/4476* (2013.01); *F16J 15/52* (2013.01); *B60G 2204/128* (2013.01); *B60G 2204/418* (2013.01)

(58) Field of Classification Search
CPC ...... F16C 19/10; F16C 33/581; F16C 33/588; F16C 33/761; F16C 33/782; F16C 2326/05; F16C 33/80; F16J 15/3272; F16J 15/447; F16J 15/4476; F16J 15/52; F16J 15/54; B60G 15/068; B60G 2204/128; B60G 2204/418
See application file for complete search history.

(56) References Cited

U.S. PATENT DOCUMENTS 10,518,598 B1 * 12/2019 Shaikh ................ F16C 33/7853
2007/0009190 A1 * 1/2007 Yano ....................... F16C 33/58
267/221

(Continued)

FOREIGN PATENT DOCUMENTS

CN    201382091        1/2010
DE    3431710 A  *  3/1985  .......... B60G 15/068

(Continued)

*Primary Examiner* — Phillip A Johnson
(74) *Attorney, Agent, or Firm* — Volpe Koenig

(57) ABSTRACT

A suspension strut bearing assembly for connection between a portion of a suspension strut and a vehicle body. The bearing assembly includes an upper spring plate having an upper surface, a lower surface, and an opening defined therethrough, accommodates the piston rod of the shock absorber. The upper surface includes a first, concave race configured to receive rolling elements, and the lower surface includes a spring seat that is adapted to receive a suspension spring. An upper bearing washer that includes a second race that faces the first concave race 26 is provided. Rolling elements are located between the first, concave race and the second race. A retainer retains the upper bearing washer to the spring plate.

15 Claims, 6 Drawing Sheets

(51) Int. Cl.
  *F16J 15/52* (2006.01)
  *F16J 15/54* (2006.01)

(56) References Cited

U.S. PATENT DOCUMENTS

2014/0023308 A1 * 1/2014 Stautner ................ F16C 33/588
                                                              384/590
2014/0167360 A1   6/2014 Weiss, II

FOREIGN PATENT DOCUMENTS

| DE | 4129513 | 3/1993 | |
|----|---------|--------|---|
| DE | 19752268 | 5/1999 | |
| DE | 102008049976 | 4/2010 | |
| DE | 19960699 | 9/2010 | |
| EP | 0715978 | 6/1996 | |
| GB | 2217663 A * | 11/1989 | ........... B60G 15/068 |
| JP | 2005233304 A * | 9/2005 | .............. F16C 19/10 |
| WO | 2015014760 | 2/2015 | |

* cited by examiner

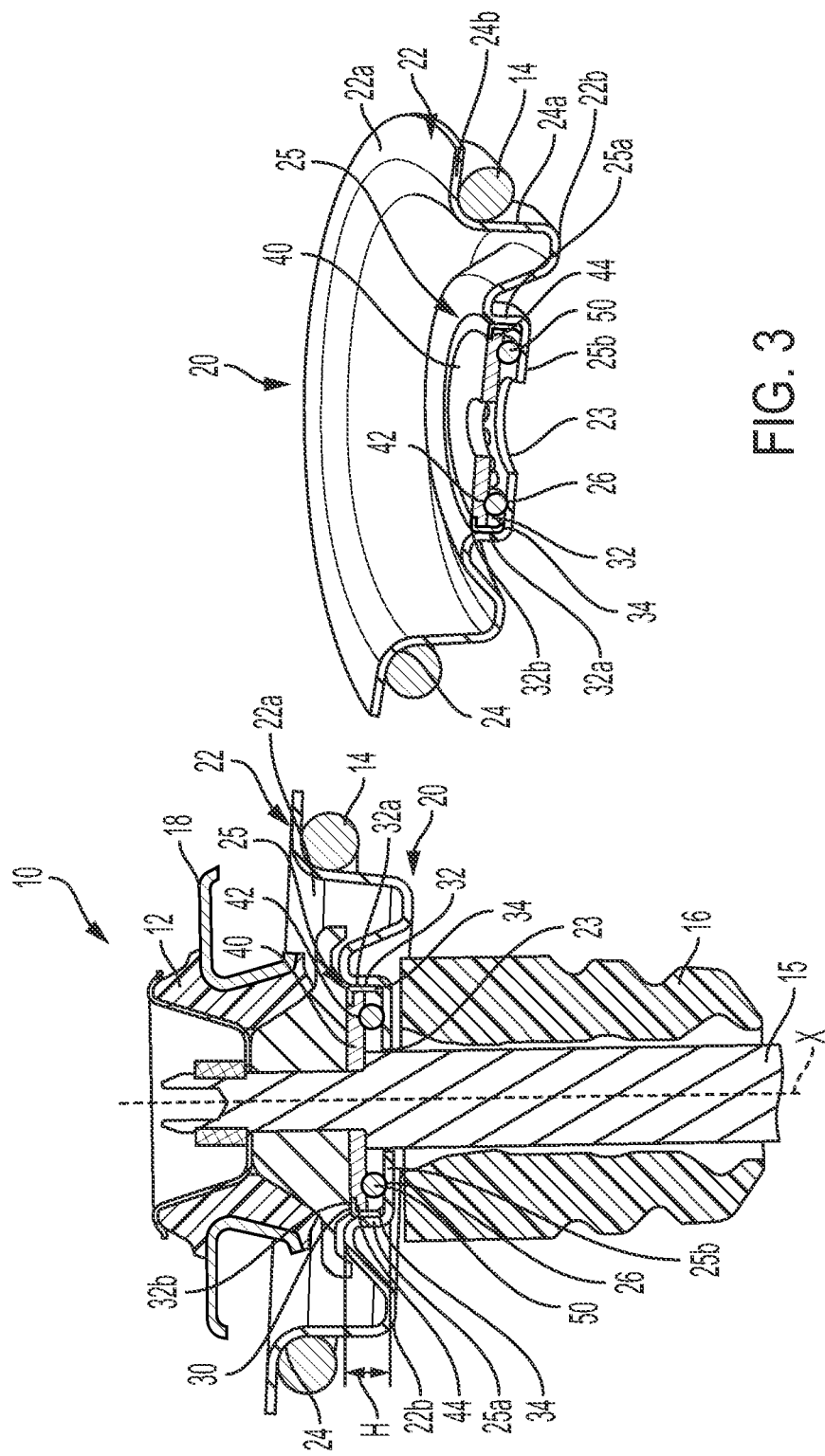

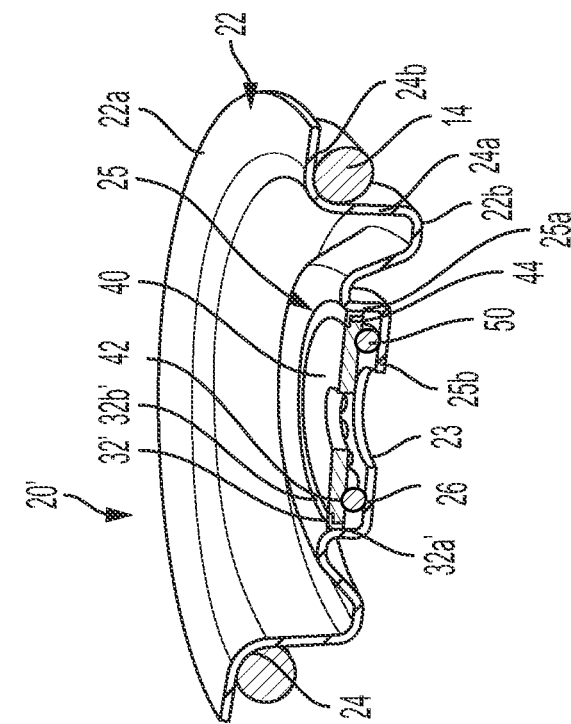
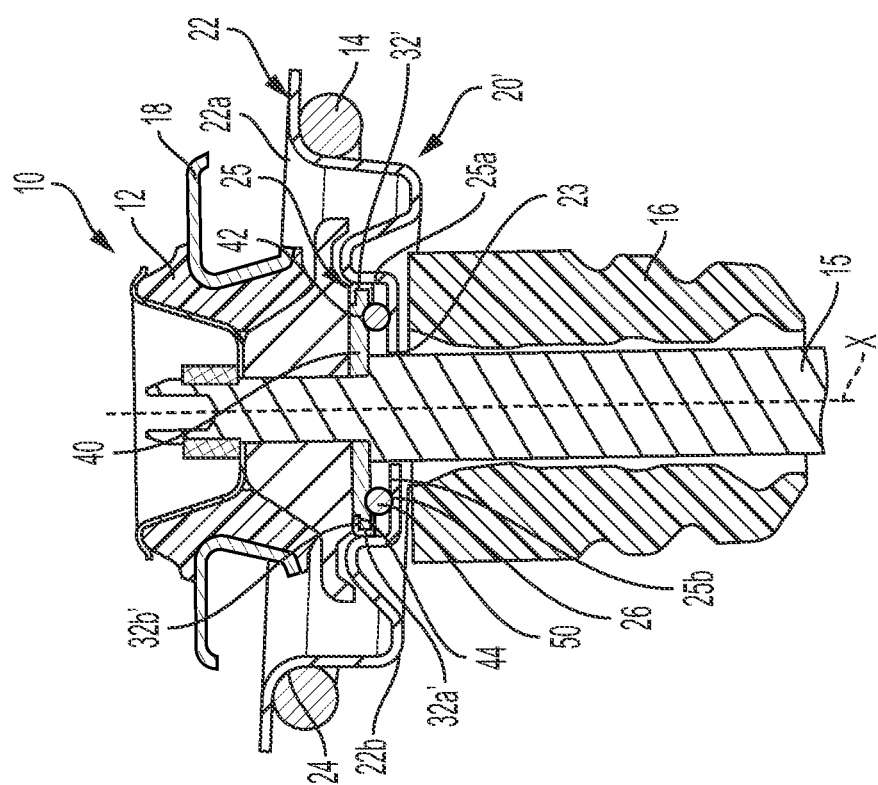
FIG. 4
FIG. 5

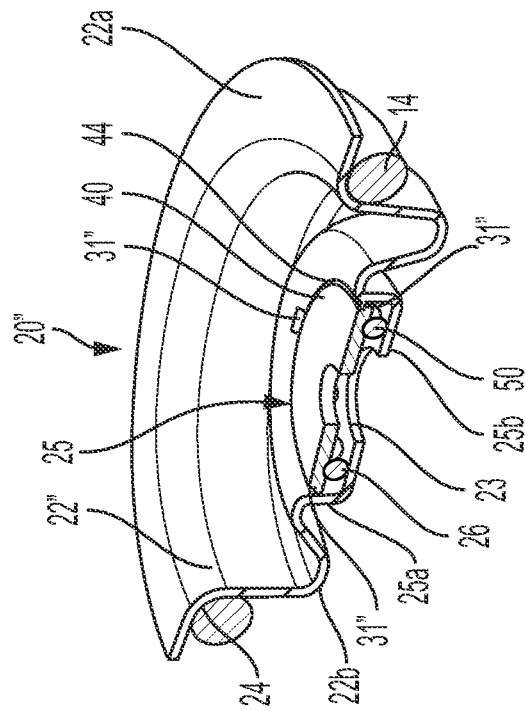
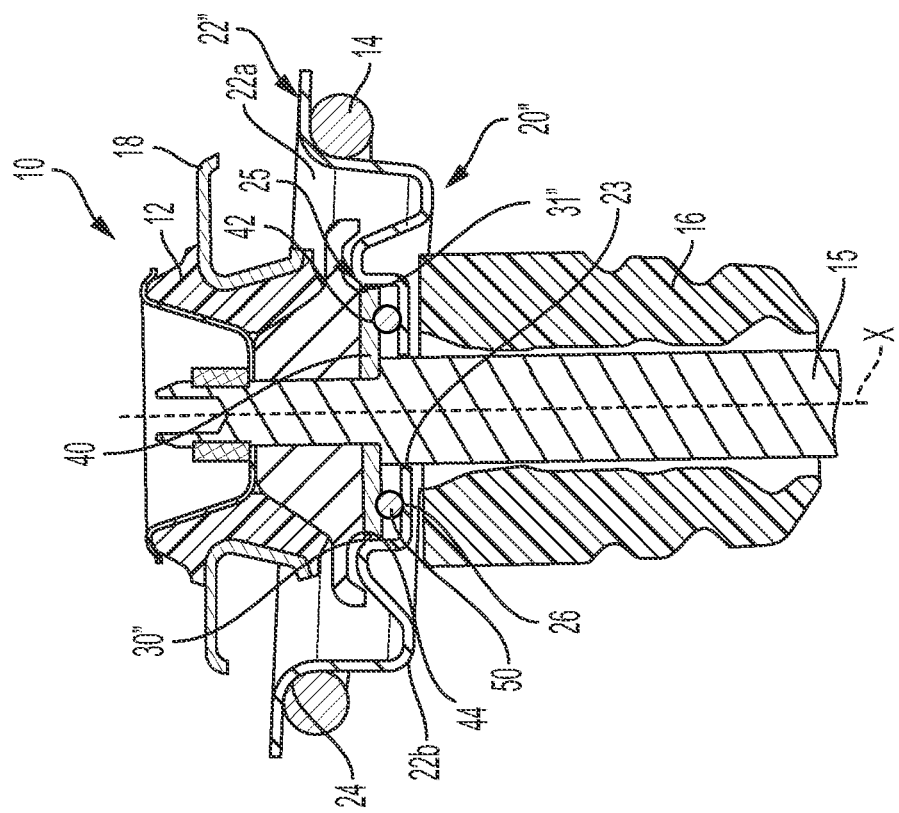

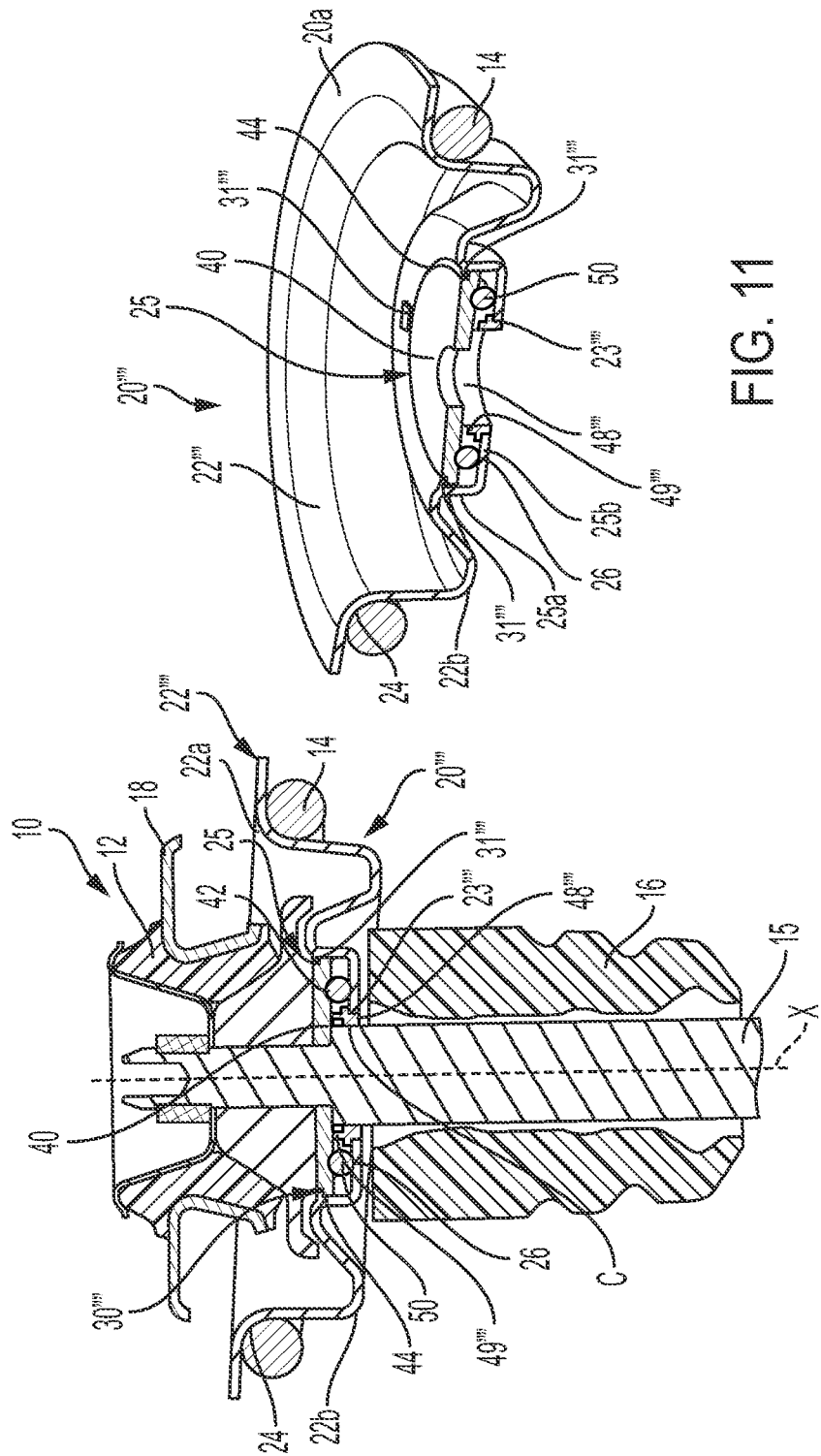

STRUT BEARING ASSEMBLY WITH METAL GUIDE RING AND SPRING SEAT

FIELD OF INVENTION

The present disclosure relates to vehicle suspension systems, and more specifically to McPherson suspension systems. More particularly, the disclosure is directed to suspension strut bearings connected to the car body between the top mount and the shock absorber spring.

BACKGROUND

Small strut supports with a single load path bearing design having a metal guide ring and spring plate for McPherson strut suspension systems are known. In the state of the art shown, shown for example in FIG. 1, it is known to provide a rolling bearing 1 having upper and lower washers with bearing balls provided as rolling elements therebetween in the load path between the top mount 2 and the upper spring plate 3. The spring 4 for the suspension strut is supported on the upper spring plate 3 that is located underneath the lower washer of the bearing 1. Other components of the suspension strut include the shock absorber 5 and bump stop 6, for example as shown.

It would be desirable to provide a suspension strut with a bearing assembly that can be assembled with a reduced part count and the same or improved functionality.

SUMMARY

In one aspect, a suspension strut bearing assembly for connection between a portion of a suspension strut and a vehicle body is provided, with the suspension strut bearing assembly comprising an upper spring plate having an upper surface, a lower surface and an opening defined therethrough. The upper surface includes a first, concave race that is configured to receive rolling elements, and the lower surface including a spring seat that is adapted to receive a suspension spring. An upper bearing washer is provided that has a second race that faces the first, concave race. Rolling elements are located between the concave race and the race. A retainer retains the upper bearing washer to the upper spring plate.

This arrangement provides for direct spring support on the lower bearing washer since the upper spring plate that supports the spring forms the lower washer as an integral part. Accordingly, an additional lower washer is no longer required.

In one arrangement, the upper spring plate includes a recess having a height that accommodates the upper bearing washer and the rolling elements.

In one embodiment, the retainer comprises a retainer cap having a radially extending portion that at least partially overlaps the upper bearing washer and an axially extending portion that engages with the upper spring plate. The axially extending portion of the retainer cap preferably has an interference fit with the upper spring plate in an area of the recess.

In one arrangement, the upper bearing washer includes an annular recess on a side opposite to the second race, and the radially extending portion of the retainer cap engages in the annular recess.

In one embodiment, the axially extending portion of the retainer cap includes an inwardly bent free end that that contacts the upper surface of the upper spring plate at a bottom of the recess.

Alternatively, the axially extending portion of the retainer cap can have a free end that is spaced apart from the upper surface of the upper spring plate at a bottom of the recess as long as a press-in height of the retainer cap is controlled.

In one arrangement, the second race is concave, and the rolling elements are balls. However, other types of rolling elements could be used.

In one embodiment, the retainer comprises at least three protrusions formed in the upper spring plate that partially radially overlap the upper bearing washer.

In one arrangement, the upper spring plate further comprises an axially extending shoulder that extends around the opening to form a labyrinth seal.

In an alternate arrangement, the opening in the upper spring plate is adapted to receive a shock absorber piston rod that extends axially through the bearing assembly, and the bearing assembly further comprises a seal located in the opening that is adapted to seal against the shock absorber piston rod.

In the disclosed embodiments, the upper spring plate is a stamped sheet metal part, and the spring seat comprises an axially extending outer ring-shaped portion that extends into a radially outwardly extending flange portion.

The upper spring plate is preferably made of steel and is hardened and tempered at least in an area of the first, concave race.

In another aspect, a suspension strut is provided comprising a spring, a shock absorber, and the bearing assembly having one or more of the features disclosed herein.

In one arrangement, a bump stop on a piston rod of the shock absorber that is adapted to contact the lower surface of the upper spring plate.

Various ones of the disclosed features can be combined with one another in order to provide additional functionality. Additional embodiments are also disclosed herein.

BRIEF DESCRIPTION OF THE DRAWINGS

The foregoing Summary and the following Detailed Description will be better understood when read in conjunction with the appended drawings, which illustrate an exemplary embodiment of the disclosure. In the drawings:

FIG. 2 is a cross-sectional view of a suspension strut including a strut bearing assembly according to a first embodiment of the present disclosure.

FIG. 3 is a perspective view, partially in cross-section, of the suspension strut bearing assembly shown in FIG. 2.

FIG. 4 is a cross-sectional view of a suspension strut assembly including a suspension strut bearing assembly according to a second embodiment of the present disclosure.

FIG. 5 is a perspective view, partially in cross-section, of the suspension strut bearing assembly shown in FIG. 4.

FIG. 6 is a cross-sectional view of a suspension strut assembly including a suspension strut bearing assembly according to a third embodiment of the present disclosure.

FIG. 7 is a cross-sectional view of the suspension strut bearing assembly shown in FIG. 6.

FIG. 10 is a cross-sectional view of a suspension strut assembly including a suspension strut bearing assembly according to a fifth embodiment of the present disclosure.

FIG. 11 is a perspective view, partially in cross-section, of the suspension strut bearing assembly shown in FIG. 10.

DETAILED DESCRIPTION

Figure 1:
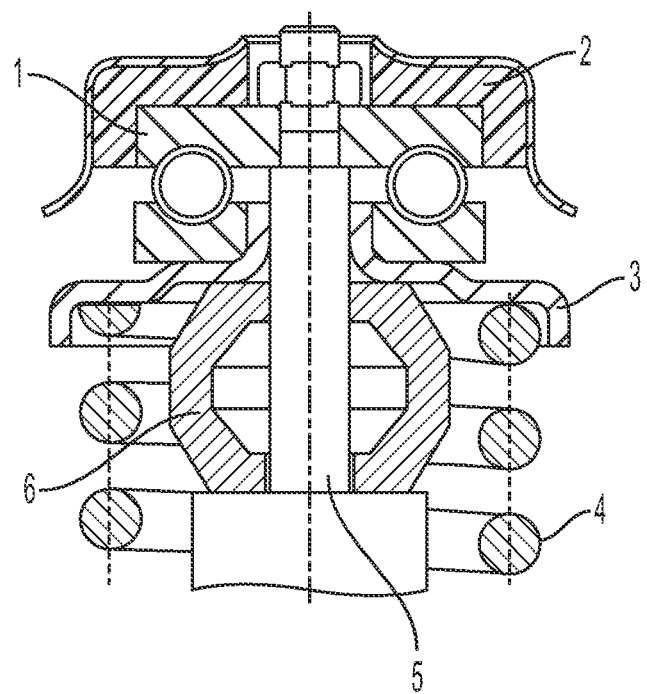
FIG. 1 is cross-sectional view of a portion of a prior art suspension strut including a strut bearing assembly.

Certain terminology is used in the following description for convenience only and is not limiting. "Axially" refers to a direction along an axis of an assembly. "Radially" refers to a direction inward and outward from the axis of the assembly. "Circumferentially" refers to a direction extending along a curve or circumference of a respective element relative to the axis of the assembly. The terms "about" and "approximately" encompass + or −10% of an indicated value unless otherwise noted. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring to FIGS. 2 and 3, a portion of a suspension strut 10 is shown. The suspension strut 10 includes a cap 12 along with a spring 14 (similar to the spring 4 in the prior art) as well as the shock absorber 15 and the bump stop 16. The suspension strut 10 is adapted to be connected to a vehicle body, indicated at 18 with appropriate elastomeric bushings being provided at the connection. The suspension strut 10 is shown with a first embodiment of a suspension strut bearing assembly 20 in FIG. 2, with the suspension strut bearing assembly 20 being illustrated separately in FIG. 3. The suspension strut bearing assembly 20 is for connection between a portion of the suspension strut 10 (the end of the spring 14 and the piston rod of the shock absorber 15) and the vehicle body 18, and includes an upper spring plate 22 having an upper surface 22a, a lower surface 22b, and an opening 23 defined therethrough, which is designed to accommodate the piston rod of the shock absorber 15. The upper surface 22a includes a first, concave race 26 that is configured to receive rolling elements 50, and the lower surface 22b includes a spring seat 24 that is adapted to receive a suspension spring 14. As shown in detail in FIG. 3, an upper bearing washer 40 that includes a second race 42 that faces the first concave race 26 is also provided. The second race 42 can also be concave. Rolling elements 50 are located between the first, concave race 26 and the second race 42. A retainer 30 is provided that retains the upper bearing washer 40 to the spring plate 22.

In this arrangement, as compared to the prior art, the need for a separate lower washer for the bearing that is separate from the upper spring plate is eliminated and a single integrated part is provided in the form of the upper spring plate 22 that includes the first, concave race 26 that is used to form the suspension strut bearing assembly 20.

As shown in detail in FIGS. 2 and 3, the upper spring plate 22 includes a recess 25 having a height H that accommodates the bearing washer 40 and the rolling elements 50.

In the first embodiment of the suspension strut bearing assembly 20, the retainer 30 is formed as a retainer cap 32 that includes a radially extending portion 32a that at least partially overlaps the upper bearing washer 40, as well as an axially extending portion 32b that engages with the upper spring plate 22. As shown in FIGS. 2 and 3, in the first embodiment of the suspension strut bearing assembly 20, the axially extending portion 32b of the retainer cap 32 has an interference fit with the upper spring plate 22 in an area of the recess 25, which in the illustrated embodiment is with an axial wall portion 25a of the recess 25.

Still with reference to FIGS. 2 and 3, here, the upper bearing washer 40 may include an annular recess 44 on a side opposite to the second race 42, and the radially extending portion 32a of the retainer cap 32 engages in the annular recess 44. This provides a flush upper surface for the retainer cap 32 and the upper bearing washer 40.

The upper spring plate 22 and the other components are designed concentric to the system axis X.

In order to control a height that the retainer cap 32 is pressed into the recess 25, the axially extending portion 32a of the retainer cap 32 may include a radially inwardly bent free end 34 that contacts the upper surface 22a of the spring plate 22 at a bottom 25b of the recess 25. This inwardly bent free end 34 ensures that the axial end of the retainer cap 32 can firmly contact the bottom 25b of the recess 25, taking into account the bend radius where the axial wall portion 25a of the recess 25 transitions into the bottom 25b. Using this arrangement, the proper clearances for the suspension strut bearing assembly 20 can be maintained during assembly.

Referring to FIGS. 4 and 5, a second embodiment of the strut bearing assembly 20' is shown which is useable in connection with the suspension strut 10. Identical components have the same element numbers while components that are modified are indicated with a prime. In the second embodiment of the suspension strut bearing assembly 20', the upper spring plate 22 is the same as the upper spring plate 22 discussed in connection with the first embodiment. However, the retainer 30' is formed with a retainer cap 32' that includes an axially extending portion 32a' as well as a radially extending portion 32b'. Here, the axially extending portion 32a' has an interference fit with the axial wall portion 25a of the recess 25 and has a free end 34' that is spaced apart from the upper surface 22a of the spring plate 22 at a bottom 25b of the recess 25. The insertion height of the retainer cap 32' is controlled during assembly in order to provide the proper preload of the upper bearing washer 40 against the rolling elements 50 and the first, concave race 26 in the upper surface 22a of the upper spring plate 22.

As shown in FIGS. 4 and 5, preferably, the upper bearing washer 40 also includes the annular recess 44 into which the radially extending portion 32a' of the retainer cap 32' engages.

Referring now to FIGS. 6 and 7, a third embodiment of the suspension strut bearing assembly 20" that can be used in connection with the suspension strut 10 is shown. The third embodiment of the suspension strut bearing assembly 20" is similar to the first and second embodiments and like elements have been designated with the same element numbers. The differences are explained below. In the third embodiment, the retainer 30" comprises at least three protrusions 31" formed in the upper spring plate 22" that partially radially overlap the upper bearing washer 40. This eliminates the need for the retainer cap as discussed above in connection with the first and second embodiments, further reducing the number of parts needed for assembly of the suspension strut bearing assembly 20". The protrusions 31" can be formed by stamping or swaging some of the material of the upper spring plate 22" after assembling the rolling elements 50 and the upper washer 40 together on to the upper spring plate 22".

Figures 8, 9:
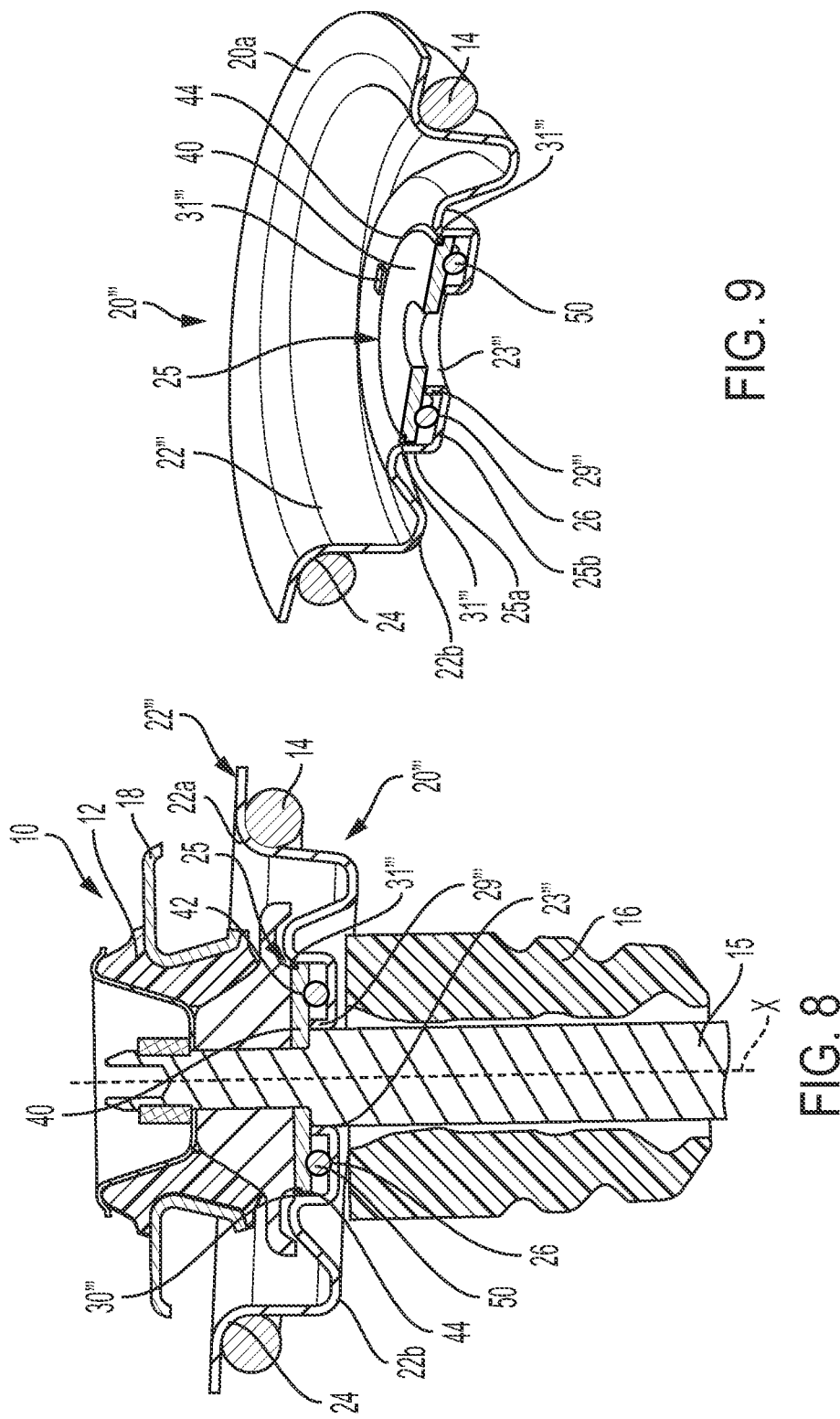
FIG. 8 is a cross-sectional view of a suspension strut assembly including a suspension strut bearing assembly according to a fourth embodiment of the present disclosure.
FIG. 9 is a perspective view, partially in cross-section, of the suspension strut bearing assembly shown in FIG. 8.

Referring now to FIGS. 8 and 9, a fourth embodiment of the suspension strut bearing assembly 20''' that can be used in connection with the suspension strut 10 is shown. The fourth embodiment of the suspension strut bearing assembly 20''' is similar to the third embodiment of the bearing assembly 20" in that it uses the retainer 30''' with at least three protrusions 31''' in the upper spring plate 22''', similar to the protrusions 31" noted above, in order to hold the upper bearing washer 40 in position. Alternatively, the retainer cap 32, 32' could be used. In order to improve sealing performance, the upper spring plate 22''' further includes an axially extending shoulder 29''' that extends around the opening 23''' that is adapted to receive the shock absorber piston rod in order to form a labyrinth seal. This improves contamination resistance in order to improve bearing life.

Referring now to FIGS. 10 and 11, a fifth embodiment of the suspension strut bearing assembly 20'''' is shown for use in connection with the suspension strut assembly 10. The fifth embodiment of the suspension strut bearing assembly 20'''' is similar to the third embodiment of the bearing assembly 20" in that it uses the retainer 30'''' with at least three protrusions 31'''' in the upper spring plate 22'''', similar to the protrusions 31" noted above, in order to hold the upper bearing washer 40 in position. Alternatively, the retainer cap 32, 32' could be used.

In the fifth embodiment, the opening 23'''' in the upper spring plate 22'''' that is adapted to receive the shock absorber 15 piston rod that extends axially through the bearing assembly 20'''' includes a seal 48'''' located in the opening 23'''' that is adapted to seal against the shock absorber 15 piston rod. The seal 48'''' is a static seal and is preferably made of plastic or rubber and is assembled to the spring plate 22''''. Here, the inner diameter of the seal 48'''' is made for a small clearance C to the shaft of the shock absorber 15. The clearance C is preferably in the range of −0.005 to 0.03 inches. Further, the seal may include a lip 49'''' that is directed further upwardly in order to further resist contamination entering the bearing.

Here, the upper bearing washer 40 is shown as being retained in the same manner as in the third and fourth embodiments 20", 20''' of the suspension strut bearing assembly using the protrusions 31''''. Alternatively, the retainer cap 32, 32' could be used.

In each of the embodiments of the suspension strut bearing assembly discussed above, the upper spring plate 22, 22", 22''', and 22'''', is a stamped sheet metal part and the spring seat 24 comprises a generally-axially extending outer ring-shaped portion 24a (only indicated in FIGS. 2 and 3) that extends into a radially outwardly extending flange portion 24b (also only indicated in FIGS. 2 and 3). This arrangement is adapted to receive an end of the spring 14, as shown in FIG. 2. In each case, the upper spring plate 22, 22", 22''', and 22'''' is hardened and tempered at least in an area of the first, concave race 26.

In each case, the suspension strut assembly 10 can be assembled using any of the bearing assemblies 20, 20', 20", 20''', 20'''' discussed above along with the spring 14 and the shock absorber 15, as well as preferably a bump stop 16 that contacts the lower surface 22b of the upper spring plate 22, 22", 22''', and 22'''', and the cap 12.

Having thus described the embodiments in accordance with the present disclosure in detail, it is to be appreciated and will be apparent to those skilled in the art that many physical changes, only a few of which are exemplified in the detailed description of the exemplary embodiment, could be made without altering the concepts and principles embodied therein. It is also to be appreciated that numerous embodiments incorporating only part of the exemplary embodiment are possible which do not alter, with respect to those parts, the inventive concepts and principles embodied therein. The exemplary embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LIST OF REFERENCE NUMERALS

1 Roller bearing
2 Top mount
3 Upper spring plate
4 Spring
5 Shock absorber
6 Bump stop
10 Suspension strut
12 Cap
14 Spring
15 Shock absorber
16 Bump stop
18 Vehicle body
20, 20', 20", 20''', 20'''' Suspension strut bearing assembly
22, 22", 22''' Upper spring plate
22a Upper surface
22b Lower surface
23, 23''', 23'''' Opening
24 Spring seat
24a Outer ring-shaped portion
24b Radially outwardly extending flange portion
25 Recess
25a Axial wall portion
25b Bottom
26 First, concave race
29''' Axially extending shoulder
30, 30', 30", 30''', 30'''' Retainer
31", 31''', 31'''' Protrusions
32, 32' Retainer cap
32a, 32a' Radially extending portion
32b, 32b' Axially extending portion
34 Free end
40 Upper bearing washer
42 Second race
44 Annular recess
48'''' Seal
49'''' Lip
50 Rolling elements
C Clearance
H height
X System axis

The invention claimed is:

1. A suspension strut bearing assembly for connection between a portion of a suspension strut and a vehicle body, the suspension strut bearing assembly comprising:
   an upper spring plate having an upper surface, a lower surface and an opening defined therethrough, the upper surface including a first, concave race that is configured to receive rolling elements, and the lower surface including a spring seat that is adapted to receive a suspension spring;
   an upper bearing washer including a second race that faces the first, concave race;
   the rolling elements located between the first, concave race and the second race; and
   a retainer that retains the upper bearing washer to the upper spring plate.

2. The bearing assembly of claim 1, wherein the upper spring plate includes a recess having a height that accommodates the upper bearing washer and the rolling elements.

3. The bearing assembly of claim 2, wherein the retainer comprises a retainer cap having a radially extending portion that at least partially overlaps the upper bearing washer and an axially extending portion that engages with the upper spring plate.

4. The bearing assembly of claim 3, wherein the axially extending portion of the retainer cap has an interference fit with the upper spring plate in an area of the recess.

5. The bearing assembly of claim 3, wherein the upper bearing washer includes an annular recess on a side opposite to the second race, and the radially extending portion of the retainer cap engages in the annular recess.

6. The bearing assembly of claim 3, wherein the axially extending portion of the retainer cap includes an inwardly bent free end that that contacts the upper surface of the upper spring plate at a bottom of the recess.

7. The bearing assembly of claim 3, wherein the axially extending portion of the retainer cap has a free end that is spaced apart from the upper surface of the upper spring plate at a bottom of the recess.

8. The bearing assembly of claim 1, wherein the second race is concave, and the rolling elements are balls.

9. The bearing assembly of claim 1, wherein the retainer comprises at least three protrusions formed in the upper spring plate that partially radially overlap the upper bearing washer.

10. The bearing assembly of claim 1, wherein the upper spring plate further comprises an axially extending shoulder that extends around the opening to form a labyrinth seal.

11. The bearing assembly of claim 1, wherein the opening in the upper spring plate is adapted to receive a shock absorber piston rod that extends axially through the bearing assembly, and the bearing assembly further comprises a seal located in the opening that is adapted to seal against the shock absorber piston rod.

12. The bearing assembly of claim 1, wherein the upper spring plate is a stamped sheet metal part, and the spring seat comprises an axially extending outer ring-shaped portion that extends into a radially outwardly extending flange portion.

13. The bearing assembly of claim 12, wherein the upper spring plate is hardened and tempered at least in an area of the first, concave race.

14. A suspension strut comprising a spring, shock absorber, and the bearing assembly of claim 1.

15. The suspension strut of claim 14, further comprising a bump stop on a piston rod of the shock absorber that is adapted to contact the lower surface of the upper spring plate.

* * * * *